(12) United States Patent
Jasny et al.

(10) Patent No.: US 12,030,642 B2
(45) Date of Patent: Jul. 9, 2024

(54) DOUBLE-DOOR MODULE FOR AIRCRAFT SEATS

(71) Applicant: Safran Seats, Plaisir (FR)

(72) Inventors: Franck Jasny, Venesmes (FR); Daniele Guerra, Bourges (FR); Denys Lavergne, Sainte Lizaigne (FR); Bruno Lopez, Charost (FR); Christian Verny, Issoudun (FR)

(73) Assignee: Safran Seats, Plaisir (FR)

( * ) Notice: Subject to any disclaimer, the term of this patent is extended or adjusted under 35 U.S.C. 154(b) by 604 days.

(21) Appl. No.: 17/263,472

(22) PCT Filed: Jul. 11, 2019

(86) PCT No.: PCT/EP2019/068747
§ 371 (c)(1),
(2) Date: Jan. 26, 2021

(87) PCT Pub. No.: WO2020/020658
PCT Pub. Date: Jan. 30, 2020

(65) Prior Publication Data
US 2021/0163140 A1     Jun. 3, 2021

(30) Foreign Application Priority Data
Jul. 27, 2018 (FR) .......................... 1870873

(51) Int. Cl.
*B64D 11/06* (2006.01)
*E05B 47/00* (2006.01)

(52) U.S. Cl.
CPC ...... *B64D 11/0606* (2014.12); *B64D 11/0605* (2014.12); *E05B 47/00* (2013.01); *E05B 2047/0048* (2013.01)

(58) Field of Classification Search
CPC . B64D 11/0606; B64D 11/0605; E05B 47/00; E05B 2047/0048
See application file for complete search history.

(56) References Cited

U.S. PATENT DOCUMENTS

| 11,174,029 B2* | 11/2021 | Nicholas | ............ B64D 11/0601 |
| 2013/0241247 A1* | 9/2013 | Wallace | ............ B64D 11/0604 |
| | | | 297/118 |

FOREIGN PATENT DOCUMENTS

| CN | 101426995 A | 5/2009 |
| CN | 106029496 A | 10/2016 |

(Continued)

OTHER PUBLICATIONS

International Patent Application No. PCT/EP2019/068747, International Search Report (with English translation) and Written Opinion, dated Sep. 16, 2019.

(Continued)

*Primary Examiner* — Justin M Benedik
(74) *Attorney, Agent, or Firm* — Kilpatrick Townsend & Stockton LLP

(57) ABSTRACT

The present invention relates essentially to a double-door module for aircraft seats, characterized in that it comprises:
  a first door that is mobile in translation between a stowed position and a deployed position,
  a second door that is mobile in translation between a stowed position and a deployed position,
  the first door and the second door overlapping completely when the first door and the second door are simultaneously in the stowed position, and
  a control system comprising a device for locking and unlocking the first door and/or the second door.

17 Claims, 4 Drawing Sheets

(56) References Cited

FOREIGN PATENT DOCUMENTS

| EP | 3225548 | A1 | * | 10/2017 | ........... B64C 1/1423 |
|----|---------|----|---|---------|------------------------|
| EP | 3225548 | A1 |   | 10/2017 | |
| FR | 3050717 | A1 |   | 11/2017 | |
| WO | 2015155687 | A1 |   | 10/2015 | |
| WO | WO-2015155687 | A1 | * | 10/2015 | ............... B60N 2/34 |
| WO | 2017066559 | A1 |   | 4/2017 | |
| WO | 2018093825 | A1 |   | 5/2018 | |
| WO | WO-2018093825 | A1 | * | 5/2018 | ............. B60N 2/005 |

OTHER PUBLICATIONS

China Patent Application No. 201980049849.9, Office Action, dated Apr. 21, 2023.

\* cited by examiner

[Fig. 1]
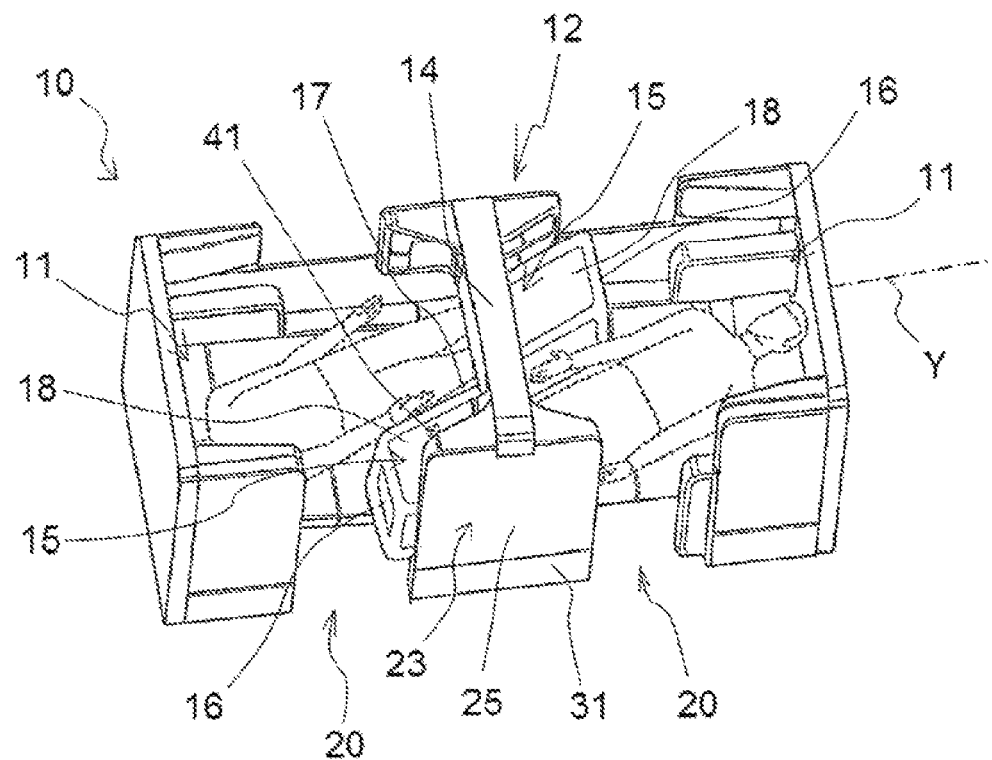
[Fig. 2a]
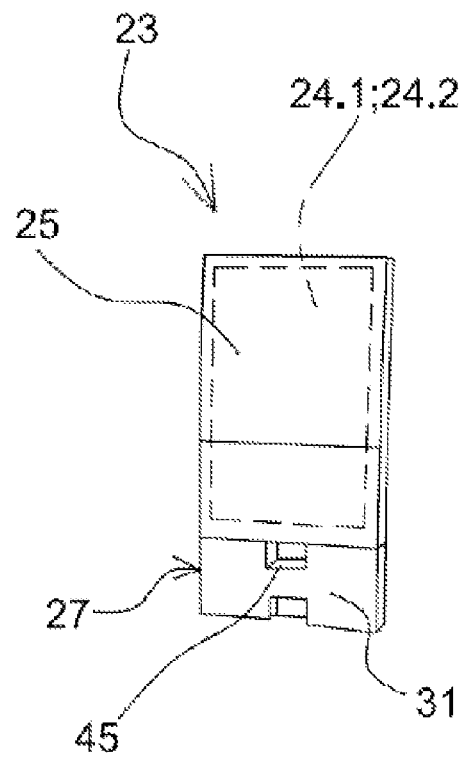

[Fig. 2b]
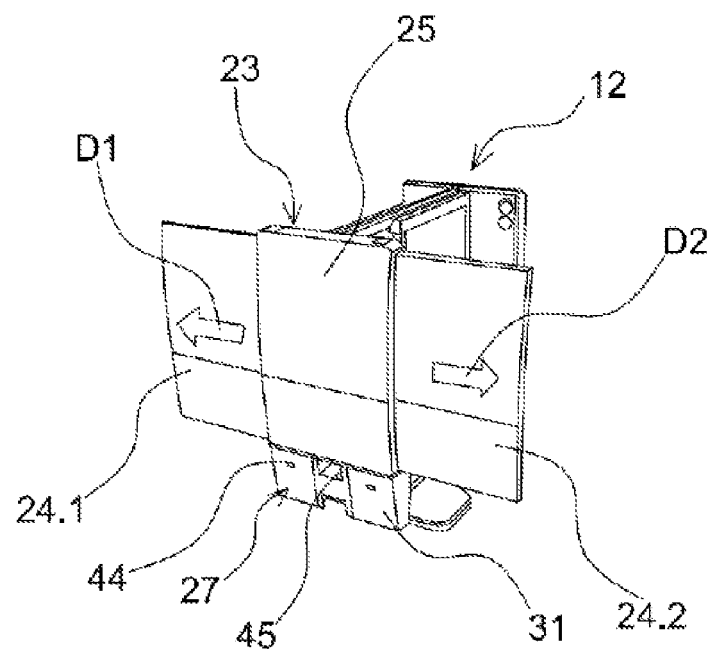
[Fig. 3]
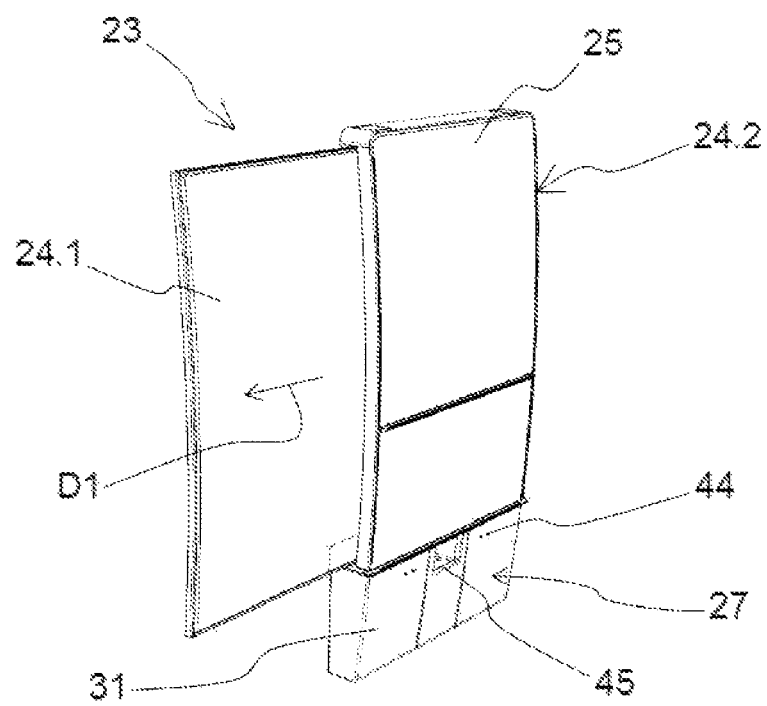

[Fig. 4]
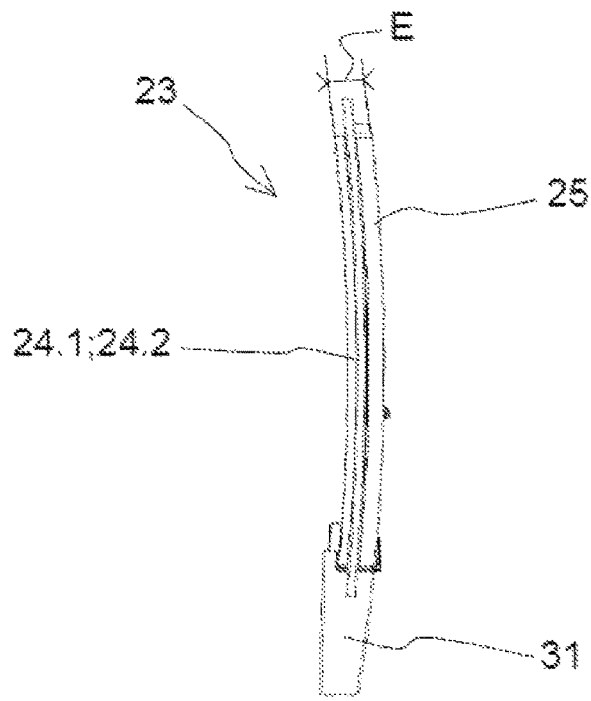
[Fig. 5]
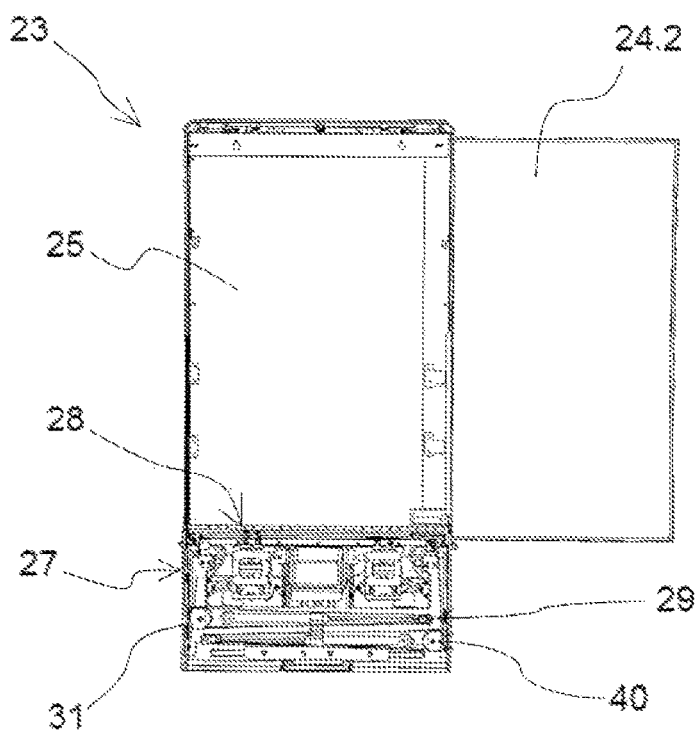

[Fig. 6]
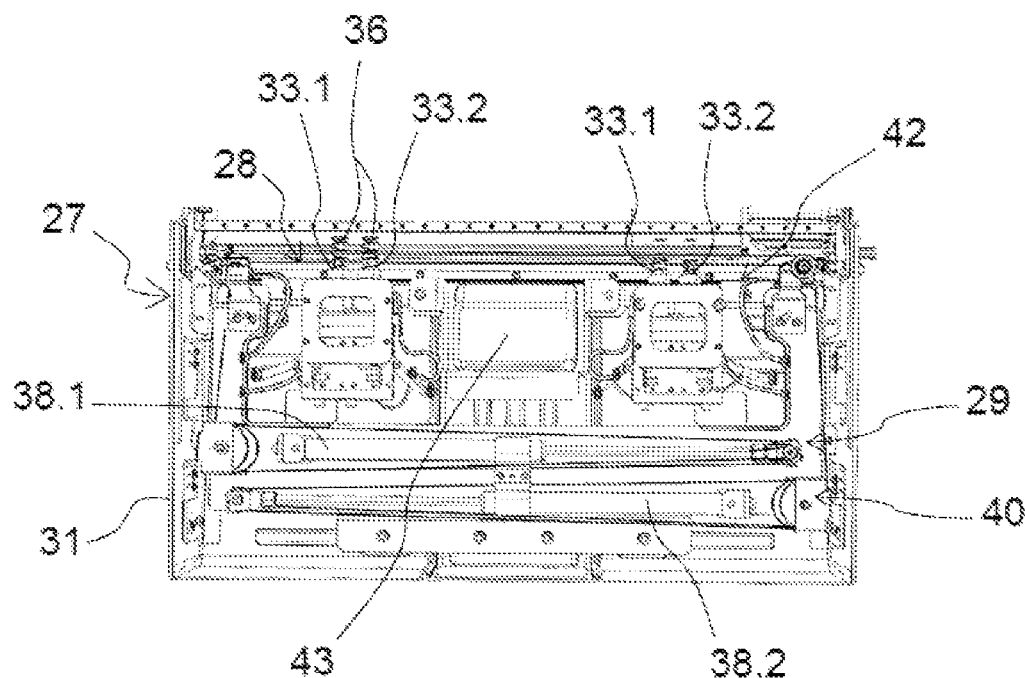
[Fig. 7]
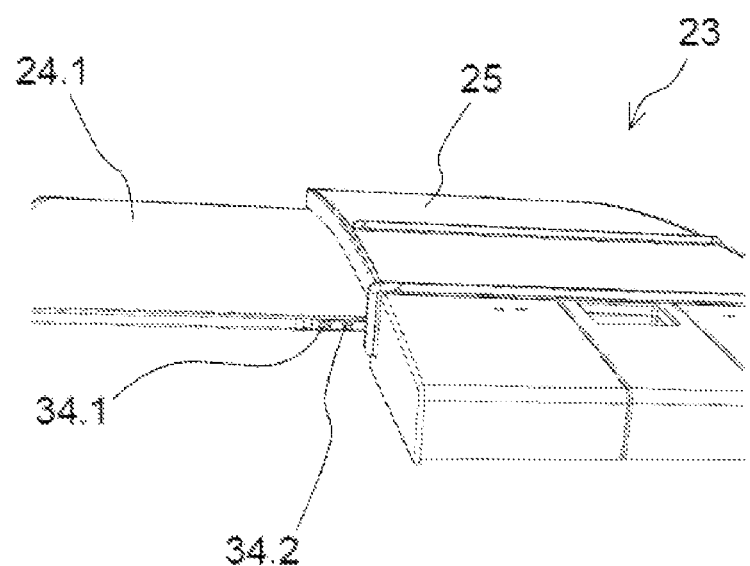

DOUBLE-DOOR MODULE FOR AIRCRAFT SEATS

The present invention relates to a double-door module for aircraft seats.

The aircraft seats of the 'Business Class' type offer passengers different positions of comfort, from the 'sitting' position up to a 'lying' position, in which the seat defines a substantially horizontal sleeping surface for a passenger.

Intermediate positions of comfort are also available, such as the 'relax' position, in which the backrest is strongly inclined. Typically, these positions are obtained by the inclination of the backrest, pivoting about a horizontal axis. The passenger can then remain in the seat during transitions between the different positions. The bed is usually formed by the backrest, the seat, a leg rest and a foot rest, theses rests being fixed or connected to the kinematics of the seat.

Document WO2015/155687 discloses a seat unit comprising two seats facing one another. Each seat may be arranged such that it is substantially laterally aligned with the other seat. A central console positioned between the seats has a transverse partition wall. In addition, the central console comprises two feet zones open in two opposite directions relative one to another. Each foot zone is respectively associated with a corresponding seat facing the foot zone opening.

Such an arrangement allows direct access to an aisle for all passengers. Therefore, when walking in an aisle laterally located relative to the seat, a passenger or the flight staff is likely to be in direct visual contact with a passenger in a seat. Such a situation creates a lack of privacy, so that the seated passenger can feel a lack of comfort.

The invention aims at effectively overcoming this disadvantage by proposing a double-door module for aircraft seats characterized in that it comprises:
- a first door movable in translation between a stored position and a deployed position,
- a second door movable in translation between a stored position and a deployed position,
- the first and second door being superposed when the first door and the second door are in the stored position, and
- a control system comprising a device for locking and unlocking the first door and/or the second door.

Thus, by using two doors integrated into the module, the invention enables to define an enclosed interior space around each seat of the unity of seats, so that the passenger can feel a sense of privacy as he or she cannot be seen by other passengers and/or the staff walking in the aisle. In addition, the invention enables to make a compact double-door module, which has a high operational reliability and which is easy to handle. The locking system enables to secure the use of the module, preventing it from being closed during the stop, taking-off, and landing of the plane, as well as in phases of emergency. The locking system also enables to maintain the doors open during an evacuation operation: the passenger or staff can slide the door until the door is blocked by the locking system, and even when the supply of actuators is severed.

According to an embodiment, said double-door module further comprises a control device for the displacement of the first door and/or second door from one position to another.

According to one embodiment, a casing containing the control system is distinct from a housing containing the first door and the second door.

According to one embodiment, the casing of the control system is arranged in the lower part of the double-door module.

According to one embodiment, the housing containing the first door and the second door has a thickness between 5 and 10 cm and of approximately 7.5 cm.

According to one embodiment, the locking and unlocking device comprises, for each door, at least one electromagnetic actuator, which is movable between an inactive position, in which the electromagnetic actuator is engaged in a locking recess in the door so as to block the translation of said door into the stored position, and an active position, in which the electromagnetic actuator is disengaged from the locking recess so as to enable the door to move.

According to one embodiment, the electromagnetic actuator is of the type normally in the inactive position to enable to lock the door in the stored position when the electromagnetic actuator is not powered.

According to one embodiment, the module comprises an elastic return member for the electromagnetic actuator in the inactive position.

According to one embodiment, the locking and unlocking device comprises, for each door, a first electromagnetic actuator intended to be controlled by a passenger and a second electromagnetic actuator intended to be controlled by a member of the staff.

According to one embodiment, a first locking recess and a second locking recess respectively associated with the first electromagnetic actuator and the second electromagnetic actuator have different geometries.

According to one embodiment, said double-door module comprises an actuating button for a displacement of a corresponding door.

According to one embodiment, the displacement control device includes at least one deployment actuator and one movement transmission device for moving the deployment actuator towards a corresponding door.

According to one embodiment, the deployment actuator is a gas cylinder.

According to one embodiment, the movement transmission device is a belt and pulley device.

In one embodiment, the control system includes visual status indicators for the system.

According to one embodiment, a casing of the control system is incorporated into a step.

The invention also relates to a seating unit characterized in that it comprises a double-door module as defined above.

According to one embodiment, the seat unit comprises two seats facing one another, each seat being arranged such that it is substantially laterally aligned with the other seat, and a center console is positioned between the seats, said double-door module being disposed along one side of the central console.

The present invention will be better understood and further characteristics and advantages will become apparent upon reading the following detailed description comprising embodiments, given by way of illustration, with reference to the accompanying figures, given by way of not limiting examples, that can be used to supplement an understanding of the present invention and the presentation of its implementation and, if necessary, contributing to its definition, in which:

FIG. 1 is a perspective view of a seating unit according to the present invention;

FIGS. 2a and 2b are perspective views of a double-door module according to the invention with doors in the stowed position and deployed position, respectively;

FIG. 3 is a perspective view of a double-door module of the present invention;

FIG. 4 is a side view of a double-door module according to the present invention;

FIG. 5 is a front view of the double-door module according to the invention without the cover of the control system;

FIG. 6 is a front view of the double-door module according to the invention without the cover of the control system;

FIG. 7 is a bottom view of the double-door module according to the invention showing the locking recesses for the electromagnetic actuators associated with one of the doors of said module.

It should be noted that, in the figures, the structural and/or functional elements common to the different embodiments may have the same references. Thus, unless otherwise stated, such elements have identical structural, dimensional and material properties.

FIG. 1 shows a seat unit 10 comprising two seats 11, in which the seats 11 face one another. Advantageously, a seat 11 is adapted to switch between a 'sitting' position, corresponding to the position used in particular during the stop, take-off, and landing phases of the aircraft, and a 'lying' position, in which the seat 11 defines a substantially horizontal 'lying' surface for the passenger. In particular, the 'seating' position and the 'lying' position constitute configurations of the seat 11 in two extreme positions. According to variant embodiments, the seat can also take intermediate positions, called relax positions, between these two extreme positions.

Each seat 11 can be arranged such that it is substantially laterally aligned with the other seat 11 relative to a longitudinal axis Y of the seat unit 10.

A center console 12 positioned between the seats 11 comprises a transverse partition wall 14. The partition wall preferably includes a space for mounting displays, electronic devices, storage compartments.

In addition, the center console 12 comprises two foot zone 15 open in two opposite directions relative to one another. Each foot area is respectively associated with a corresponding seat 11 facing the opening of the foot zone 15.

A foot zone 15 is located in the extension of the corresponding seat 11 when the latter is in the lying position. The foot zones 15 are superposed at least partially along the longitudinal axis Y.

The foot zones 15 are each delimited by a bottom 16, the bottoms 16 being interconnected by a common wall 17. The common wall 17 is advantageously inclined with respect to the longitudinal axis Y.

In addition, each of the foot zones 15 also have a flat upper wall 18, on which the passenger of the opposite seat 11 may in particular place objects. The upper wall 18 may thus be used as a table, working surface, dining table, cocktail table or any other suitable surface for a passenger seated in the opposite seat 11 (that is to say the seat 11 which has no access to the opening of the foot zone 15). In other words, a portion of the foot zone 15 extends into the space occupied by a passenger seated in the opposite seat 11.

In order to close the passage 20 of each seat 11 to an aircraft aisle, the seat unit 10 comprises a double-door module 23 at one side of the center console 12.

This module 23 comprises a first door 24.1 and a second door 24.2. Each door 24.1, 24.2 is movable in translation between a stored position, in which the door is 24.1, 24.2 disposed inside a housing 25, as shown in FIG. 2a, and an extended position, in which the door 24.1, 24.2 closes a corresponding passage 20, as shown in FIG. 2b.

The first and second door 24.1 24.2 are superposed, in particular inside the housing 25, when the doors 24.1 and 24.2 are simultaneously in the stored position. Advantageously, the two doors 24.1, 24.2 are superposed along the majority of their surfaces in the stored position, or even over all of their surfaces. Under 'the majority of their surfaces' it is meant a superposition of the doors 24.1, 24.2 along at least 50% of their surfaces, preferably along at least 80% of their surfaces. Furthermore, in the zone where the doors 24.1, 24.2 are superposed, a straight line perpendicular to a surface of one of the doors 24.1, 24.2 intersects the other door 24.1, 24.2.

The passage from the stored position to the deployed position of the first door 24.1 is effected in a first direction D1 opposite to a second direction D2 along which the second door 24.2 moves from the stored position to a deployed position. The movements of the doors 24.1, 24.2 are independent from one another.

In addition, as can be seen in FIGS. 5 and 6, the door module comprises a control system 27 comprising a device 28 for locking and unlocking the first door 24.1 and/or the second door 24.2, as well as a control device 29 for moving the first door 24.1, 24.2 and/or the second door 24.1, 24.2 from one position to another.

The casing 31 containing the control system 27 is distinct from the housing 25 containing the doors 24.1 and 24.2, that is to say that the casing 31 contains only all the components of the control system 27, so that the housing 25 does not contain any component of this control system 27. This makes it possible to produce a compact module 23 which has, at the housing 25, a thickness E between 5 and 10 cm and equal to approximately 7.5 cm, as shown in FIG. 4. Under 'approximately' it is meant a variation of more or less 10% around this value.

In the example shown, the casing 31 of the control system 27 is arranged in the lower part of the module 23. The casing 31 could alternatively be disposed in the upper part of the module 23.

Preferably, the locking and unlocking device 28 comprises, for each door 24.1, 24.2, at least one electromagnetic actuator 33.1, 33.2, visible in FIG. 6, intended to cooperate with a corresponding locking recess 34.1, 34.2 in the door 24.1, 24.2 and visible in FIG. 7. The locking recess 34.1, 34.2 is provided in the lower edge of the door.

The actuator 33.1, 33.2 is movable between an inactive position, in which the actuator 33.1, 33.2 is engaged in the locking recess 34.1, 34.2 for locking the translation of the door 24.1, 24.2 by the action of an elastic return member 36, and an active position, in which the actuator 33.1, 33.2 is disengaged from the corresponding locking recess 34.1, 34.2 to enable the door 24.1, 24.2 to move.

Advantageously, there is provided, for each door 24.1, 24.2, a first electromagnetic actuator 33.1 intended to be controlled by a passenger and a second electromagnetic actuator 33.2 intended to be controlled by a member of the staff. Locking recesses 34.1, 34.2, respectively associated with the first actuator 33.1 and the second actuator 33.2 of a door, are visible in FIG. 7. The actuators 33.1, 33.2 and locking recesses 34.1, 34.2 are arranged so that the corresponding door 24.1, 24.2 can be blocked in the stored position.

For security reasons, an electromagnetic actuator 33.1, 33.2 is of the type normally in the inactive position, that is to say it is in an inactive position when a current does not circulate therethrough. When the actuator 33.1, 33.2 is supplied with a current, it moves towards its active position. An elastic return member 36, such that a spring, enables the actuator 33.1, 33.2 to be easily returned from the active position to the inactive position and maintained in this position.

In order to enable a door to be simultaneously locked by both actuators 33.1, 33.2, the locking recesses 34.1, 34.2 have different geometries, preventing the electromagnet cooperating with the second locking recess 34.2 from being engaged in the first locking recess 34.1. Thus, both recesses 34.1, 34.2 and the corresponding actuator rods 33.1, 33.2 will have for example different sizes and/or shapes.

Moreover, as can be seen in FIG. 6, the movement control device 29 comprises at least one deployment actuator 38.1, 38.2 and a transmission device 40 for the movement of the actuator 38.1, 38.2 to a corresponding door 24.1, 24.2.

Advantageously, the deployment actuator 38.1, 38.2 is a gas cylinder and the movement transmission device 40 is a belt and pulley device. Alternatively, the deployment actuator 38.1, 38.2 is an electric motor or a hydraulic cylinder. As a variant, the movement transmission device 40 is geared.

The displacement of a door 24.1, 24.2 may be controlled by a corresponding actuating button 41 inside the seat module 11.

Sensors 42, in particular position and/or strain sensors, are provided for transmitting information enabling a control unit 43 to manage the movement of the doors 24.1, 24.2 according to an actuating or locking demand for the door from the passenger or the member of the staff.

The control system 27 may also comprise at least one visual status indicator 44 for the system, visible in FIG. 3. The visual indicator 44 may be for example of the luminous or mechanical type with a window and colored zones, for example, green and red zones on the door.

The casing 31 of the control system 27 may include a step 45 to allow the stewards or stewardesses to easily access to the luggage compartment.

Moreover, the seat units 10 allow the passengers to evacuate the seat, providing a clearance of the aisles in the aircraft.

The invention can also be implemented with seats in other means of transport, such as bus, train, or boat seats.

Of course, the different characteristics, variants and/or embodiments of the present invention can be associated with each other in various combinations insofar as they are not incompatible or mutually exclusive.

Of course, the invention is not limited to the above-described embodiments, provided only as an example. It encompasses various modifications, alternative forms and other variants that can be considered by the skilled person within the framework of the present invention, including any combination of the various above-described modes of operation, which may be taken separately or in combination.

The invention claimed is:

1. A double-door module for aircraft seats, characterized in that it comprises:
   a first door movable in translation between a stored position and a deployed position,
   a second door movable in translation between a stored position and a deployed position,
   the first door and the second door being superposed when the first door and the second door are in the stored position, and
   a control system comprising a device for locking and unlocking the first door and/or the second door,
   the locking and unlocking device comprising, for each door, at least one electromagnetic actuator, which is movable between an inactive position, in which the electromagnetic actuator is engaged in a locking recess made in the door, so as to block the translation of said door into the stored position, and an active position, in which the electromagnetic actuator is disengaged from the locking recess so as to enable the door to move,
   wherein the locking recess is provided in a lower edge of the door, the locking recess being made within a lower thickness of the door.

2. The double-door module according to claim 1, characterized in that it comprises a control device for the displacement of the first door and/or second door from one position to another.

3. The double-door module according to claim 2, characterized in that a casing containing the control system is distinct from a housing containing the first door and the second door.

4. The double-door module according to claim 3, characterized in that the casing of the control system is arranged in the lower part of the double-door module.

5. The double-door module according to claim 3, characterized in that the housing containing the first door and the second door has a thickness (E) between 5 and 10 cm and of approximately 7.5 cm.

6. The double-door module according to claim 1, characterized in that the electromagnetic actuator, is of the type normally in the inactive position to enable to lock the door in the stored position when the electromagnetic actuator is not powered.

7. The double-door module according to claim 6, characterized in that it comprises an elastic return member for the electromagnetic actuator, in the inactive position.

8. The double-door module according to claim 7, characterized in that the locking and unlocking device comprises, for each door, a first electromagnetic actuator intended to be controlled by a passenger and a second electromagnetic actuator intended to be controlled by a member of the staff.

9. The double-door module according to claim 8, characterized in that a first locking recess and a second locking recess, respectively associated with the first electromagnetic actuator and the second electromagnetic actuator, have different geometries.

10. The double-door module according to claim 2, characterized in that it comprises an actuating button for a displacement of a corresponding door.

11. The double-door module according to claim 2, characterized in that the displacement control device includes at least one deployment actuator, and one movement transmission device for moving the deployment actuator towards a corresponding door.

12. The double-door module according to claim 11, characterized in that the deployment actuator is a gas cylinder.

13. The double-door module according to claim 11, characterized in that the movement transmission device is a belt and pulley device.

14. The double-door module according to claim 1, characterized in that the control system includes visual status indicators for the system.

15. The double-door module according to claim 1, characterized in that a casing of the control system is incorporated into a step.

16. A seat unit, characterized in that it comprises a double-door module as defined in claim 1.

17. The seat unit according to claim 16, characterized in that it comprises two seats facing one another, each seat being arranged such that it is substantially laterally aligned with the other seat, and a center console is positioned between the seats, said double-door module being disposed along one side of the central console.

* * * * *